(12) United States Patent
Choi

(10) Patent No.: US 6,249,331 B1
(45) Date of Patent: Jun. 19, 2001

(54) METHODS FOR FORMING AN ORIENTATION LAYER ON LCD PANELS

(75) Inventor: Weon-woo Choi, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/705,075

(22) Filed: Nov. 2, 2000

Related U.S. Application Data

(62) Division of application No. 09/212,040, filed on Dec. 15, 1998, now Pat. No. 6,169,592.

(30) Foreign Application Priority Data

Jan. 20, 1998 (KR) .................................................. 98/1598

(51) Int. Cl.⁷ .......................... G02F 1/1337; G03C 1/725
(52) U.S. Cl. .......................... 349/124; 349/123; 349/125; 430/286
(58) Field of Search .................................... 349/123, 124, 349/125; 430/20, 286; 428/1; 156/275.5, 273.3, 273.7

(56) References Cited

U.S. PATENT DOCUMENTS

| | | | |
|---|---|---|---|
| 4,177,074 | 12/1979 | Prokow | 430/286 |
| 4,517,278 | 5/1985 | Sakurai | 430/286 |
| 5,143,819 | 9/1992 | Mirle et al. | 430/286 |
| 5,419,991 | * 5/1995 | Segawa | 430/20 |
| 5,831,704 | * 11/1998 | Yamada et al. | 349/124 |

FOREIGN PATENT DOCUMENTS

| | | |
|---|---|---|
| 3-192359 | 8/1991 | (JP) . |
| 4-75026 | 3/1992 | (JP) . |

* cited by examiner

*Primary Examiner*—William L. Sikes
*Assistant Examiner*—Tarifur R. Chowdhury
(74) *Attorney, Agent, or Firm*—Myers Bigel Sibley & Sajovec, P.A.

(57) ABSTRACT

An APR plate includes a polyimide (PI) pattern portion having a first hardness and corresponds to an effective screen area of an LCD panel and a PI pattern edge portion having a second hardness that is greater than the first hardness and corresponds to a non-effective screen area of the LCD panel. Associated methods of forming the dual-hardness resin plate and methods and apparatus of fabricating an orientation layer on a LCD panel include APR resin plates configured to yield uniform PI layers and inhibit PI lump generation even after the APR plate is repeatedly used in printing.

12 Claims, 5 Drawing Sheets

METHODS FOR FORMING AN ORIENTATION LAYER ON LCD PANELS

RELATED APPLICATIONS

This application is a divisional of U.S. patent application Ser. No. 09/212,040, filed Dec. 15, 1998, now U.S. Pat. No. 6,169,592, which is hereby incorporated herein in its entirety by reference. This application claims foreign priority from Korean Application Serial No. 1598/1998, filed Jan. 20, 1998.

FIELD OF THE INVENTION

The present invention relates to equipment, photosensitive resin plates, and methods associated with the fabrication of an organic high-polymer material orientation layer onto a glass panel used in a liquid crystal display (LCD).

BACKGROUND OF THE INVENTION

Recent developments in advanced image displays, such as high definition TV (HDTV), have increased the demand for flat panel displays. One type of known flat panel display is a liquid crystal display (LCD). LCD's have several features and advantages which are not generally associated with other types of displays. For example, LCD's can operate in color, have relatively low-power demands, and also have high-speed performance relative to other types of displays such as electro-luminescence displays (ELDs), vacuum fluorescence displays (VFDs), and plasma display panels (PDPs).

Generally stated, LCDs can be characterized as either passive or active. Active type LCDs include pixels controlled by an active element such as a thin film transistor (TFT). Active type LCDs typically have much better response speed, visual display angle, color reproduction, and contrast compared to passive type LCDs. These characteristics make active type LCDs particularly suitable for use in HDTV, which generally requires high-resolution displays. In addition, these characteristics allow an active LCD to be thinner, lighter, and operate with lower power requirements. As a result, active type LCDs are also used as "notebook" computer monitors and in other display applications.

The active type of LCD is generally formed from several layers of materials; a thin film transistor (TFT) substrate layer, a color filter substrate layer, and a liquid crystal material layer positioned between the two substrates. Typically, the TFT substrate includes an intersecting array of spaced-apart gate lines and data lines. Generally stated, each intersecting area of a gate line and a data line includes a thin film transistor and a pixel electrode (typically a common-type electrode). In a conventional configuration, a protective layer, e.g., a nitride layer, together with pixel electrodes of ITO (indium tin oxide) material are formed on the gate lines. As such, the gate lines, the data lines, the thin film transistors and the pixel electrodes form the TFT substrate. Black matrices and color filters are formed on the color substrate layer. A protective layer and common electrodes of ITO material are also formed on the black matrices and the pixel electrodes to form the color filter substrate layer. The color filter substrate layer is positioned opposite the TFT substrate layer. The liquid crystal material is inserted into a space defined by the area between the TFT substrate and the color filter substrate layers, the space being on the order of about several $\mu m$'s.

The pixel or common electrodes of the TFT substrate and the color filter substrate include an orientation layer conventionally formed of a high-polymer material, such as polyimide, which is generally surface-treated by rubbing the material to obtain a thickness of about 500 to 1000 Å. In addition, a polarizer film is typically attached to the outer surfaces of the TFT substrate and the color filter substrate. The orientation layer of the pixel electrodes functions to arrange molecules of the liquid crystal material on the TFT substrate and the color filter substrate such that they align in a predetermined direction. Polyimide resin can provide stability and durability in the orientation layer and is particularly suited to be used to form the orientation layer in the LCD display.

Examples of known processes used to obtain or form the orientation layer include organic high-polymer layer coating processes such as spin coating and flexographic technology. Generally stated, when the orientation layer is formed by spin coating technology, a pattern is formed and certain portions of the pattern are etched, which can be cumbersome and labor intensive work.

Recently, flexographic technology has been successfully used to apply the orientation layer. According to the flexographic technology, the orientation layer can be directly printed in a predetermined pattern without requiring any etching process. Generally described, the flexographic process can in theory be a substantially continuous process which uses a series of rollers to transfer a quantity of polyimide resin as a predetermined pattern onto the desired surface of the selected LCD layer (typically comprising a glass surface layer). Stated differently, the flexographic apparatus can be configured to automatically convey a plurality of glass panels sequentially through the process. The apparatus employs a special resin plate with a series of holding cells configured in a predetermined pattern to hold a quantity of polyimide resin (PI) processing solution. The resin plate is rotated and subsequently brought into direct contact with the glass panel surface to release the solution and transfer the predetermined pattern to form the orientation layer onto the surface. The glass panel is then heated to pre-cure the orientation layer.

Unfortunately, however, the flexographic process is not without problems. For example, as conventionally used, as will be discussed further herein, this process can disadvantageously be subject to frequent interruptions for cleaning, can have poor process yield, and can (intermittently) produce LCD's which have less than satisfactory display characteristics.

OBJECTS AND SUMMARY OF THE INVENTION

It is therefore an object of the present invention to provide an improved processing method for forming an orientation layer on the surface of a predetermined LCD layer.

It is an additional object of the invention to provide an improved apparatus for fabricating an orientation layer onto the surface of a LCD panel.

It is also an object of the present invention to provide an improved (photosensitive) resin plate.

It is another object of the present invention to provide a method for fabricating an improved photosensitive resin plate.

These and other objects, advantages, and features are provided by the present invention, which includes an improved hybrid surface on the resin plate. A first aspect of the present invention is directed towards a photosensitive resin plate for printing an orientation layer on a liquid crystal display panel. The photosensitive resin plate comprises a photosensitive resin body, at least one polyimide (PI) pattern portion formed on a surface of the body, and at least one polyimide (PI) pattern edge portion positioned around the PI pattern portion on the surface of the body. The PI pattern portion includes a plurality of projections having a first hardness and the PI pattern edge portion includes a plurality of projections having a second hardness greater than the first hardness. In a preferred embodiment, the PI pattern portion corresponds to an effective screen area of an LCD panel and the PI pattern edge portion corresponds to a non-effective screen area of the LCD panel. Preferably, the PI pattern edge portion is configured to abut and enclose the polyimide pattern portion. It is also preferred that the at least one PI pattern and pattern edge portions are a plurality of pattern and pattern edge portions and that the plate be configured to include also at least one dummy pattern positioned between adjacent PI pattern edge portions.

Another aspect of the invention is a method for fabricating a photosensitive resin plate for use in printing polyimide (PI) material onto a liquid crystal display panel. The method comprises the steps of providing a quantity of a photosensitive resin in a shape which has opposing first and second ends and exposing the first end of the photosensitive resin to a curing source to cure the first end of the photosensitive resin to a predetermined depth. The method also includes masking a portion of the second end of the photosensitive resin by positioning a film having a pattern of apertures thereon to overlay the second end of the photosensitive resin. The second end of the photosensitive resin is then exposed to a curing source to cure the unmasked portion of the second end. A projection pattern is formed on the second end of the photosensitive resin. The projection pattern defines a polyimide (PI) pattern portion corresponding to an effective screen area of a LCD panel and a polyimide (PI) pattern edge portion corresponding to a non-effective area of the LCD panel. The hardness of the material associated with the polyimide (PI) pattern portion is reduced and the hardness of the polyimide (PI) pattern edge is increased, thereby fabricating a hybrid dual-hardness photosensitive resin plate. Preferably, the forming step is performed by surface etching the second end to remove the uncured masked portion of the photosensitive resin to form a series of projections and recesses (solution holding cells) in the second end surface. In a preferred embodiment, the reducing step is performed by soft-exposing (i.e., exposing for a shorter cure time) the PI pattern portion, and the increasing step is performed by hard-exposing (i.e., exposing for a longer cure time) the PI pattern edge portion. It is also preferred that the reducing step includes the step of masking the PI pattern edge portion from the exposure to the cure source during the soft-exposing step while the increasing step includes the step of masking the PI pattern portion from exposure to the cure source during the hard-exposing step.

Another aspect of the invention is a method for continuously forming an orientation layer on liquid crystal display panels. The method comprises the steps of introducing a quantity of polyimide solution onto a rotating anilox roll and compressing the rotating anilox roll by contacting the exterior surface thereof to a doctor roll positioned adjacent thereto. The method also includes the step of delivering a predetermined amount of the polyimide solution to an APR resin plate by contacting the surface of the anilox roll to an APR resin plate attached to an underlying rotatable transfer cylinder. The APR resin plate includes a pattern portion corresponding to an effective screen area of the liquid crystal display having a material of a first hardness and a pattern edge portion corresponding to a non-effective screen area of the liquid crystal display having a material of a second hardness. The second hardness is greater than the first hardness. The method further includes positioning a liquid crystal display panel surface to underlay the APR resin plate and printing a pattern of polyimide solution on the desired liquid crystal display panel surface. The printing step comprises contacting selected surfaces of the APR resin plate to the desired liquid crystal display panel surface. Preferably, the method is continuously repeatable to provide an automatic printing line to continuously print sequentially a plurality of liquid crystal display panels.

In a preferred embodiment, the APR resin plate includes a plurality of corresponding PI pattern and PI pattern edge portions and a plurality of dummy patterns positioned between each of the corresponding PI pattern and PI pattern edge portions. It is also preferred that the method further comprises the step of directing air flow around the equipment away from the APR resin plate.

Yet another aspect of the invention is directed toward an apparatus for fabricating an orientation layer on a liquid crystal display panel. The apparatus includes an anilox roll and a doctor roll operably associated with the anilox roll and positioned adjacent the anilox roll. The apparatus also includes a polyimide solution source in fluid communication with the anilox roll and a hybrid APR resin plate attached to an underlying rotatable cylinder operably associated with the anilox roll. The APR resin plate comprises a PI pattern portion having a first hardness and a PI pattern edge portion having a second hardness such that the first hardness is less than the second hardness, and configured such that the PI pattern portion corresponds to an effective screen area of the liquid crystal display and the PI edge portion corresponds to a non-effective screen area of the liquid crystal display. Similar to the APR plate discussed above, the APR resin plate preferably includes at least one set of dummy patterns positioned intermediate adjacent sets of PI pattern edge portions. In a preferred embodiment, the apparatus also includes a liquid crystal display panel advancement mechanism positioned at a predetermined height under the APR resin plate and configured such that the advancement mechanism comprises an electrostatic acrylic cover arranged to direct the air flow associated with the advancement mechanism away from the APR resin plate.

Preferably, the resin plate is configured to inhibit the polyimide (PI) processing solution from lumping, coagulating, or otherwise developing undesirable characteristics attributed to producing a number of temporally consecutive or continuously imprinted display panels. Additionally, the resin plate is preferably configured to promote uniformity in the transferred pattern and thus improve the display performance of the panels attributed to the reliable transfer of the desired pattern to form the orientation layer.

Advantageously, the improved orientation layer forming processing methods and equipment of the instant invention can improve the yield of the production lots and increase the number of acceptable units over that seen in conventional processing. Further, the methods, equipment, and apparatus of the instant invention can improve the reliability, repeatability, and quality of the deposition process of the orientation layer on the selected LCD surface. Moreover, the configuration of the improved resin-plate and/or the controlled direction of air flow away from the resin plate can inhibit the tendency of the PI solution to build-up, or lump, and thus can reduce the number of cleanings (and therefore interruptions in the process) required to prevent deterioration in the orientation layer transfer process.

The foregoing and other aspects of the present invention are explained in detail in the specification set forth below.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Certain dimensions and layers shown in the figures may be exaggerated for clarity.

In the description of the present invention, the following terms are employed to refer to and designate certain aspects of the invention. Thus, as used herein, the term "polyimide (PI) pattern portion" is meant to include an area of a photosensitive resin plate corresponding to that part of the resin plate used to transfer a PI pattern to an effective screen area of an LCD panel. A plurality of raised projections (variations in elevation of a surface of the resin plate) are formed on the PI pattern portion of the resin plate 10. These projections can also be described as a series of repeating projections and recesses which form PI solution holding cells so that polyimide (PI) solution is releasably retainable on the PI pattern portion of the resin plate. For example, in operation, i.e., during printing, PI solution held between these projections or in these holding cells is transferred to the effective screen area of the LCD panel to form the desired orientation layer. Similarly, as used herein, the term "polyimide (PI) pattern edge portion" is meant to include an area of the photosensitive resin plate which corresponds to a non-effective screen area of the LCD panel and preferably is positioned relative to the PI pattern portion such that it encloses the PI pattern portion. Like the PI pattern portion described above, a plurality of raised portions or projections are also formed on the PI pattern edge portion to be able to retain polyimide solution therein. During printing, PI solution held between these projections (holding cells) also can be transferred, but to a non-effective screen area of the LCD panel.

Orientation Layer Fabrication

Figure 1:
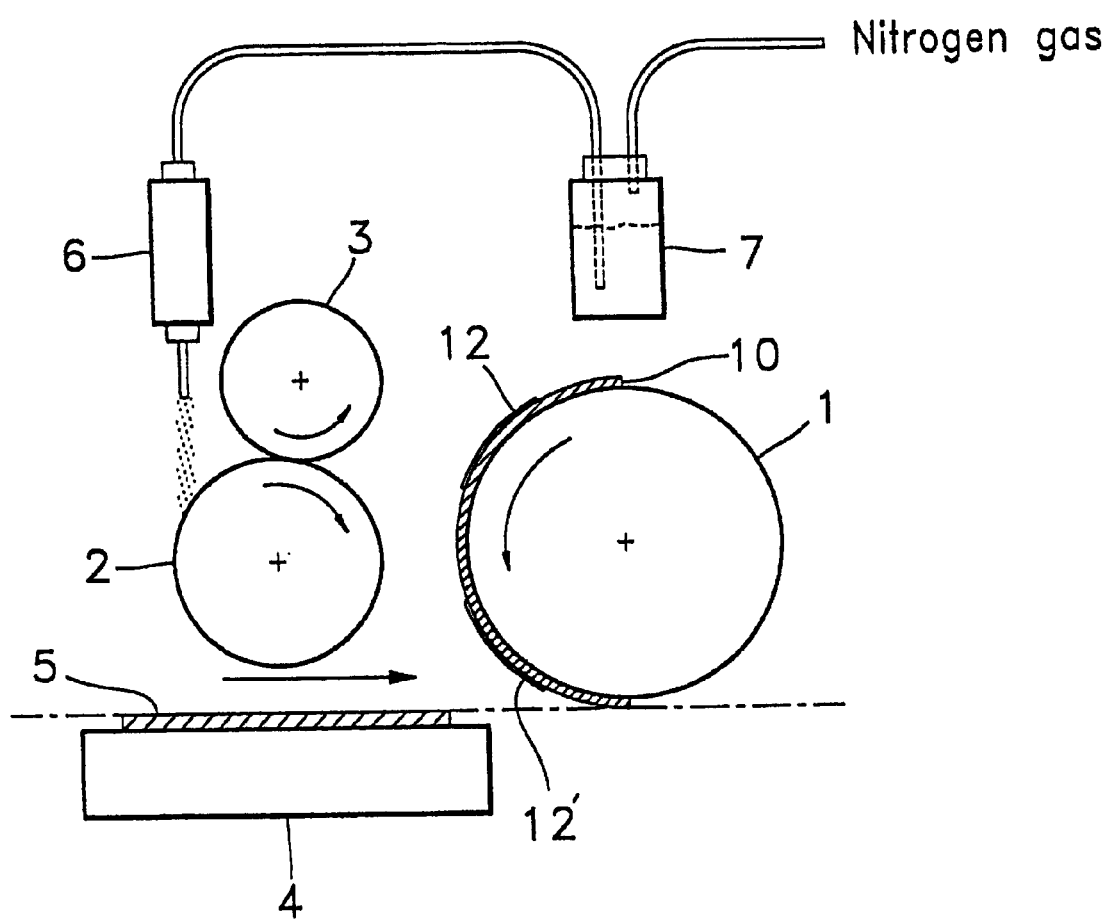
FIG. 1 is a schematic diagram of a polyimide (PI) printing apparatus associated with flexography technology.

Referring to FIG. 1, a PI printing apparatus according to the flexographic technology is schematically illustrated. Generally described, in operation, PI solution is supplied to a dispenser 6 from a PI solution contained bottle 7 through a supply tube and the PI solution is dispersed onto the anilox roll 2 through the dispenser 6 with nitrogen gas. The dispersed PI solution is dropped and maintained on the anilox roll 2. The anilox roll 2 is preferably plated with chrome, or chrome and nickel (the PI solution contacting surface). Cells having a pyramid shape (not shown) are formed in the anilox roll 2 to a depth of approximately 20 $\mu$m so that the dispersed PI solution can be retained in the cells.

A doctor roll 3 is rotated together with the anilox roll 2 to help assure that the PI solution is evenly disbursed on the surface of the anilox roll 2. A resin plate 10 is attached to an underlying plate 1 typically comprising copper. In a preferred embodiment, the resin plate 10 is formed from a polybutadiene resin, e.g., an Asahi Kasei photosensitive resin ("APR"). For ease of description, the resin plate will be described subsequently herein as an "APR plate".

As shown in FIG. 1, the APR plate 10 includes an exterior surface of predetermined patterns 12 and 12'. The patterns 12 and 12' include a plurality of projections (raised surface portions) and are positioned on the underlying plate 1 and resin plate 10 so that the patterns have a predetermined diameter relative to the center of rotation or the plate 1. Preferably, the projections are regularly arranged and spatially separated at predetermined angular positions on the patterns 12, 12' of the resin plate 10 with respect to the others. Suitable angles of projection arrangement include 45° and 75°. The patterns 12 and 12' are typically divided into a 300 mesh type, a 400 mesh type, and/or a 500 mesh type corresponding to the number of lines of projections or cells per square inch. In any event, holding cells are formed as intaglios between the projections so that the PI solution can be accommodated in the cells. The depth of the cell is preferably in the range of approximately 15 to 20 $\mu$m.

As shown in FIG. 1 and noted above, the PI solution is dispensed onto the anilox roll 2. The anilox roll and the doctor roll 2, 3 rotate and contact on an outer circumference portion. The contact pressure provided by the doctor roll helps the PI solution in the anilox roll (i.e., in the cells) be uniformly distributed and brings a certain quantity of the solution to the surface of the anilox roll due to the compression of the rolls 2, 3. The APR plate 10 then contacts the anilox roll 2 and the PI solution is supplied or delivered to the APR plate 10. Typically, the amount of the PI solution transferred to the APR plate 10 is determined by the contact force that the doctor roll 3 exerts against the anilox roll 2 (or the reverse). The PI solution is then held in the APR plate cells, the cells defined by the area between the projections formed on the patterns 12 and 12' on the APR plate 10.

The LCD panel or glass 5 is fixed to the print table 4, such as by vacuum suction. The table advances and the glass is moved forward at the same time that the copper plate 1 rotates. The APR plate 10 rotates therewith to directly contact the glass 5 which has been advanced to align with a circumferential edge portion of the APR plate 10. Then, the PI solution is applied to the glass 5 from the cells of the patterns 12 and 12' onto the APR plate 10. The contact between the patterns 12, 12' on the APR resin plate and the underlying glass 5 results in the printing of the PI solution. (transfer of the PI solution) onto the glass 5. As a result, an orientation layer is formed on the glass 5.

Thereafter, the glass 5 (with the PI solution applied thereto) is exposed to a heat source. Typically, the heat source is a hot plate and the glass is transferred to the hot plate (having a temperature of about 60 to 70° C.) and is evenly pre-cured to a predetermined thickness.

However, and unfortunately, the instant invention recognizes that when the PI solution is repeatedly printed sequentially on a plurality of glasses 5 as discussed above, the PI solution may solidify and lump together, particularly at the edge portions of the PI patterns. The PI lumps can have a size of 100 to 1000 μm and heights of more than 5 μm. The shape and frequency in occurrence of the PI lumps typically depends on the PI solution. The PI lumps cause several problems.

First, process yield is generally considerably reduced. The PI lumps with heights of more than 5 μm can be located near a sealing line. Newton rings are generated and the height of the sealing gap degrades after the PI pattern is hot pressed. As a result, uniform display performance of the panel also degrades. In addition, when the PI lumps (which are usually intermittently generated during the process) are detected via visual inspection, the repair for the lump(s) typically includes using a solvent to remove the non-uniformity/discrepancy. Unfortunately, this type of repair can introduce other particulate matter or contaminant which in itself can degrade the quality of the product.

The productivity associated with this process can also be reduced because the APR plate should be cleaned after a relatively low number of glasses are printed. In addition, when the PI solution is printed on a large substrate, e.g., a 550×650 sized substrate, the PI lumps are generated even more frequently. Accordingly, the APR plate should be cleaned by introducing a non-product or "dummy" glass after about five plates 5 have been run through the process. Another problem with the frequency of interruptions to clean the APR plate is that the interruptions inhibit the in-line automation of the equipment (i.e., the process being more batch like or semi-automatic due to the number of interruptions in the printing cycle). Further, development of new materials for use in the LCD panel can be somewhat limited due to the difficulty in selecting PI.

The instant invention recognizes that one mechanism of the PI lumps is associated with the resin plate. More particularly, over time, PI solution can be retained on the resin plate 10 and pushed toward a pattern edge portion of the APR plate when the PI solution is continuously printed. Over time, the solvent in the PI solution can vaporize. As a result, the PI solution becomes more viscous, congeals (forms a gel), or at least partially solidifies, and tends to accumulate at the pattern edge portion of the resin plate. As the viscosity of the accumulated PI solution gradually increases or the retained PI at least partially solidifies or forms a gel-like PI solution material, this retained material can then disadvantageously be transferred to the glass 5. The accumulation problem can be attributed to the plate configuration and/or the flexographic equipment set-up as described further below.

First, regarding the APR plate 10 itself, when the PI solution is printed (by contacting the APR plate 10 to the glass surface 4), the pattern edge portion of the APR plate is subject to an impact shock or force. As a result, the PI solution at the pattern edge portion is not totally transferred to the glass 5 and, as such, at least partially remains on the APR plate 10. As noted above, over time, the solvent in this retained PI solution can vaporize and the PI solution can become more viscous, congeal, or at least partially solidify. Second, the amount of retained PI solution can increase with each printing. Thus, absent frequent cleaning, the retained PI solution can continuously accumulate and build on the plate 10. The accumulated (semi-solid, viscous, or gel-type) PI solution can ultimately build up to a point that it is eventually successfully transferred to the glass 5 during the printing cycle. As a result, PI lumps can be generated on the orientation layer.

Third, regarding the printing equipment, it has been determined that PI lumps can be prolifically generated at a certain area of the pattern portion of the APR plate when air current is strongly supplied to the APR plate.

In recognition of the foregoing, in order to inhibit PI lump generation, the APR plate 10 of the instant invention is designed in a manner such that the edge portion thereof is resistant to damage induced by impact with the glass 5 when the PI solution is (continuously) printed. For example, in a preferred embodiment as will be discussed further below, the APR plate 10 is designed to include impact-resistant pattern edge portion features, such as by configuring the edge portion with a tapering angle or mesh-like configuration and/or by incorporating dummy patterns.

Further, it is preferred that the equipment be adjusted to redirect the air flow and/or minimize the air current from being introduced into the equipment in a manner which inhibits the APR plate from being dried. Preferably, the air pattern or airflow is redirected or the equipment is configured to minimize the amount of airflow introduced to the APR plate. In addition, it is also preferred that the equipment be configured with an electrostatic acrylic cover (not shown) installed on substantially the entire table surface 4 and at least the printing area of the apparatus so that air current is redirected to minimize the introduction of air onto the APR plate as well as the underlying copper plate. Accordingly, PI lump generation attributed to the APR plate and printing process can be reduced.

The APR Plate

Figure 8:
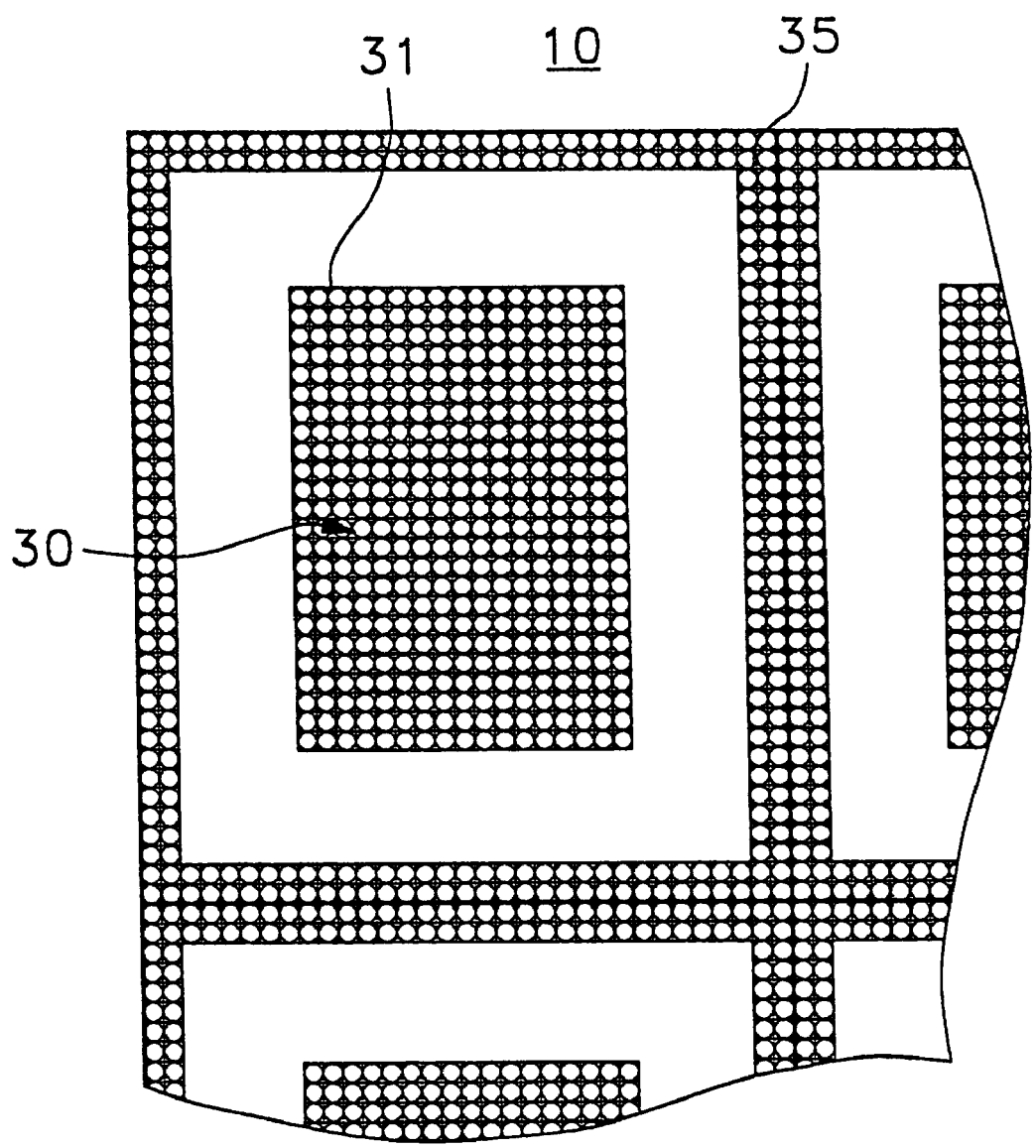
FIG. 8 is a top view of a resin plate including a plurality of PI pattern portions.

The APR plate 10 as shown in FIGS. 1 and 8, and as described above, is preferably formed of polybutadiene resin. Typically this resin has a rubber hardness of 50 to 55° (degree). During the fabrication process, the APR plate 10 is preferably surface-treated with benzophenone to maintain the desired viscosity and hardness of the APR plate.

According to experiments, the lower the surface hardness of the APR plate 10, the easier the transfer of the PI solution from the anilox roll 2 to the APR plate 10 and the greater the uniformity of the printed PI layer on the glass 5. On the other hand, the higher the surface hardness of the APR plate 10, the more impact resistant the pattern edge portion of the APR plate is when the PI solution is printed by the APR plate and the more difficult the transfer of the PI solution from the anilox roll to the APR plate. In the case of the harder surface, it is relatively difficult for the PI solution to lump thereon, but unfortunately the harder surface can cause poor uniformity in the printed PI layer.

To address these shortcomings, the present invention provides a hybrid APR plate 10 with enhanced pattern portions. For example, the APR plate of the instant invention increases the hardness of the PI pattern edge portion so that it is capable of inhibiting the PI solution from lumping. This pattern edge portion preferably corresponds to a black matrix area, i.e., the increased hardness or enhanced pattern edge portion is not opposed to an effective screen area of a LCD panel. The hybrid APR plate also preferably includes a PI pattern portion with a hardness which is less than the pattern edge portion. The lower hardness pattern portion can help provide a uniform PI layer by reducing the hardness of the pattern portion opposing the effective screen area.

Fabrication of the APR Plate

Referring now to the accompanying drawings, a method for fabricating an APR plate 10 according to a preferred embodiment of the present invention is described. For description purposes, the method will be described by way of an example of an APR plate 10 having a single PI pattern portion. However, the instant invention is not limited thereto. As will be recognized by one of skill in the art, the instant invention also encompasses plates having a plurality of pattern portions formed on the APR plate.

Figure 2:
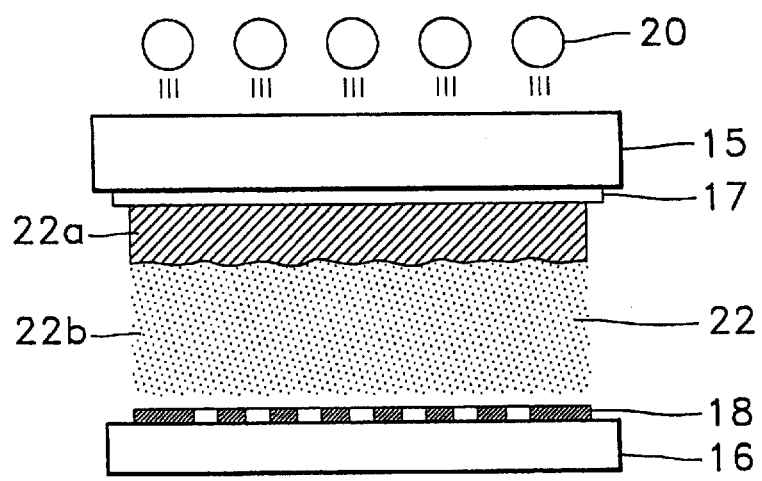
FIG. 2 is a schematic diagram of a back-exposing process for forming a resin plate according to the present invention.

As shown in FIG. 2, a negative film 18 with a series of apertures formed therethrough is mounted on a lower glass 16 of an exposing apparatus. The exposing apparatus also includes an upper glass plate 15 and a lamp or light source, preferably an ultraviolet lamp 20, positioned over the upper glass plate 15. An unsaturated APR resin 22 is placed on the negative film 18. A base film 17 is placed on the unsaturated APR resin 22. The negative film 18, the unsaturated APR resin 22 and the base film 17 are positioned such that they successively overlay the lower glass 16. As such, the negative film 18 is positioned on the lower glass 16. Also, preferably, the upper surface of the unsaturated resin 22 abuts and contacts the base film 17 and the lower surface of the unsaturated resin 22 abuts and contacts the negative film 18. Preferably, the apparatus is sized and configured such that in operation, the upper glass 15 contacts the base film 17 and compresses it and its underlying materials 22, 18, 16.

As shown in FIG. 2, the ultraviolet lamp 20 is located over the upper glass 15 so that the APR unsaturated resin 22 can be cured by back-exposing. Accordingly, the base film 17 is attached to the cured APR resin 22a. During this process, the APR unsaturated resin 22 is preferably not completely cured in the thickness direction (the direction defined by a line drawn between the upper and lower plates 15, 16). Preferably, during the back exposing process, the APR resin 22 is cured to a predetermined thickness. The cured material depth is shown in FIG. 2 by reference number 22a (corresponding to the diagonal cross-hatch marks). Reference number 22b (indicated by the dot-hatch marks) represents the substantially uncured portion of the APR plate 22.

Figure 3:
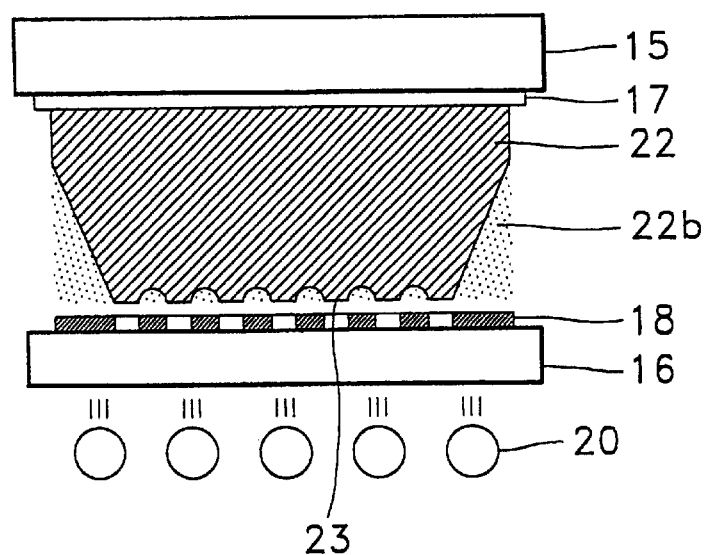
FIG. 3 is a schematic diagram of a front-exposing process for forming a resin plate according to the present invention.

Referring now to FIG. 3, the apparatus is reconfigured so that the ultraviolet lamp 20 is located under the lower glass 16. The lamp is activated and the APR unsaturated resin 22a is front-exposed as described below. More particularly, the APR resin 22 is front-exposed by directing the ultraviolet lamp 20 through the negative film 18. The negative film 18 with its apertures transmits the light onto the resin in a pattern. As such, the light freely passes through the apertures in the film and at least partially, and preferably substantially, cures the resin positioned in the area above the apertures. The solid portion of the film acts as a mask and inhibits the curing of the resin positioned above the solid portion of the film 18. Thus, the front-exposing process results in a surface portion on the APR resin 22 which is a pattern of substantially or partially cured resin and substantially uncured resin 22a, 22b, respectively.

Preferably, after the front-exposing step, the APR resin 22 is etched using a surface-active agent to form (as shown in FIG. 3) a series of projections 23 in the APR resin 22. Also preferably, the substantially uncured area of the APR resin 22b is cleaned with high-purity water. As illustrated, this series of projections is preferably generated as a series of elevational surface variations in the PI retaining portion of the APR resin, i.e., alternating projections and recesses (to define holding cells or intaglios).

Thereafter, the APR resin 22 is dried to remove the moisture thereon. The projections 23 are then preferably treated to lower or reduce their associated hardness values. In a preferred embodiment, the APR resin 22 is exposed to a liquid treatment such as by dipping the APR resin 22 into water comprising $Na_2O_3$ substantially dissolved therein. Exposing the APR resin to the aqueous dissolved $Na_2O_3$ cures the reduced-hardness projections 23.

After the projections 23 are cured, the APR resin 22 is preferably dipped in benzophenone to alter the resin to a partially cured state having a predetermined viscosity. The APR resin 22 is then cleaned with high-purity water and dried, such as by circulating warm air thereon. Thereafter, the APR resin 22 is subject to a final exposure as discussed below.

Preferably, the final exposure process of the present invention includes two exposing steps; (1) soft-exposing and (2) hard-exposing. As aforementioned, the hardness of the PI pattern portion of the APR resin 22 is reduced to facilitate uniformity in the printed PI layer. In contrast, the hardness of the PI pattern edge portion of the APR resin 22 is increased to provide impact-resistant edges and thus to inhibit the PI solution from lumping together. The soft-exposing process is now described with reference to FIGS. 4 and 5. Though the PI pattern edge portion 31 also includes projections, for clarity of description and for discussion purposes, only the projections formed on the PI pattern portion 30 are illustrated in FIG. 5. This drawing view delineates between the PI pattern portion 30 and the PI pattern edge portion 31, as the PI pattern edge portion is shown for illustration purposes as a flat surface in FIGS. 5 and 7.

Figure 4:
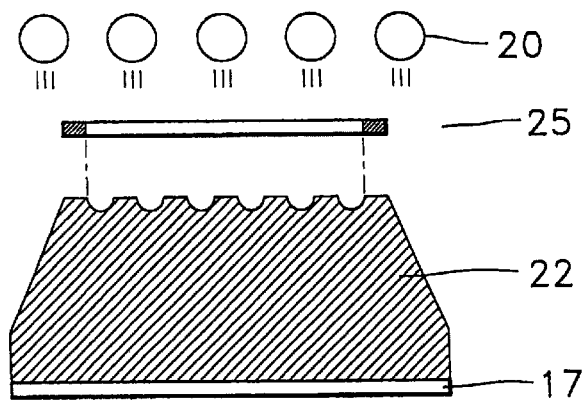
FIG. 4 is a diagram of a soft-exposing process according to the present invention.
Figure 5:
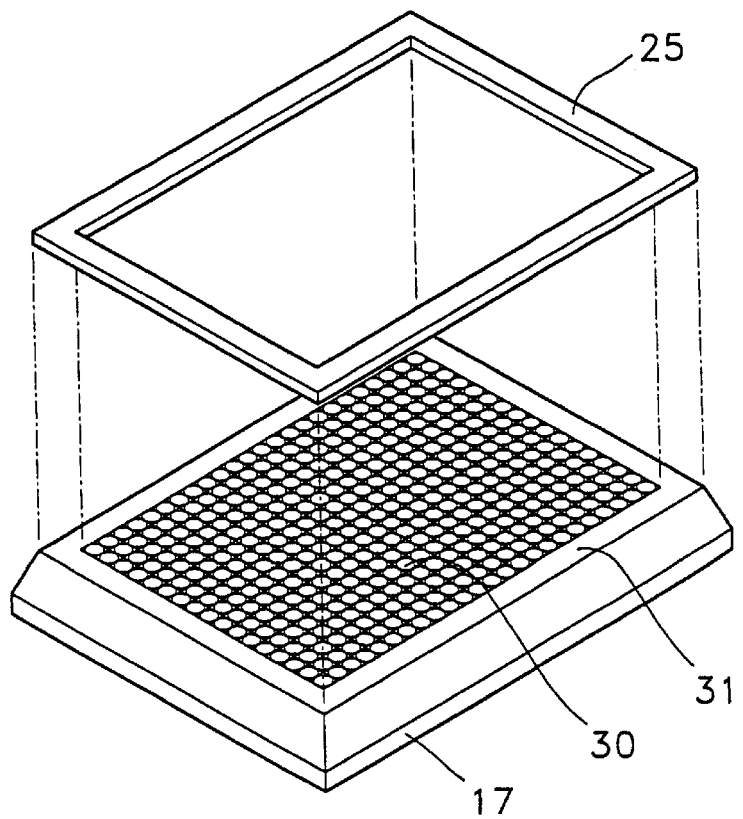
FIG. 5 is a perspective view of a shadow mask and a photosensitive resin plate according to the present invention shown as the soft-exposing process illustrated in FIG. 4 is carried out.

As shown in FIG. 4, the APR resin 22 is positioned such that the PI pattern edge portion 31 is covered with a shadow mask 25 having an opening corresponding to the PI pattern portion 30 of the APR resin 22. The APR resin 22 is positioned on an underlying plate 17. The soft-exposing step is carried out with a cure source such as a light/heat source, preferably an ultraviolet lamp 20, which is positioned above the mask 25. Preferably, the soft-exposing step is carried out by an ultraviolet lamp having a heat output of about 40 W for a time of about 1 to 2 minutes. As shown, during the soft-exposing step, only the PI pattern portion 30 is directly exposed to the light source and, thereby, the associated hardness of the soft-exposed PI pattern portion 30 is reduced. Accordingly, as aforementioned, the uniformity of the printed PI layer can be enhanced. FIG. 5 illustrates the frame-like shadow mask 25 overlying and enclosing the APR resin 22.

Figure 6:
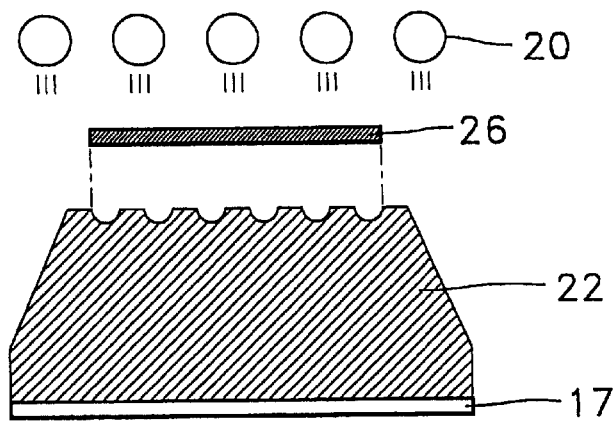
FIG. 6 is a diagram of a hard-exposing process according to the present invention.
Figure 7:
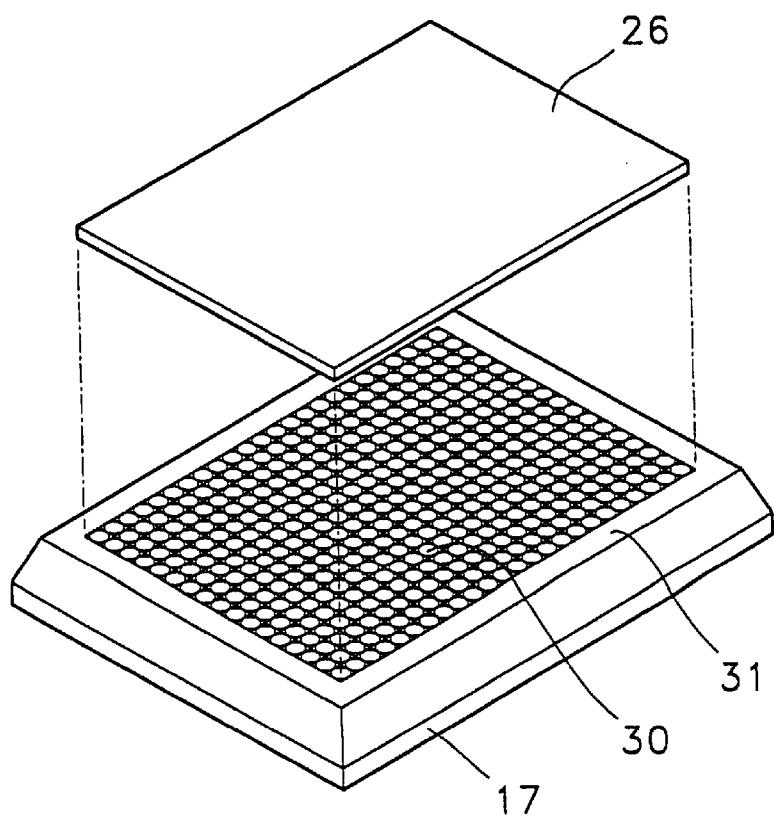
FIG. 7 is a perspective view of a shadow mask and a photosensitive resin plate according to the present invention shown as the hard-exposing process illustrated in FIG. 6 is carried out.

Turning now to FIGS. 6 and 7, after the soft-exposing step is completed, a hard-exposing step is preferably carried out. In the hard-exposing step, the PI pattern portion 30 is covered with a continuous shadow mask 26 configured and sized to correspond to the PI pattern portion 30. Similar to the soft-exposing step, the hard-exposing step is preferably performed by exposing the unmasked portion of the APR resin 22 to a cure source such as an ultraviolet lamp 20. Preferably, the lamp 20 has a heat output of about 40 W and exposes the selected APR resin 22 for about 10 to 20 minutes. Preferably, during the hard-exposing step, the PI pattern edge portion 31 is exposed (and the PI pattern portion is masked) thus increasing the hardness of the PI pattern edge portion. Therefore, as aforementioned, the PI lump generation problem attributed to the edge-portion can be inhibited. The increased hardness in this hybrid APR resin plate 10 associated with the PI pattern edge portion(s) 31 may reduce uniformity in the PI layer printed by the PI pattern edge portion 31. However, because the PI pattern edge portion 31 does not correspond to the effective screen area, the increased hardness PI pattern edge portion 31 can be used without negatively impacting display performance.

Turning now to FIG. 8, APR plates 10 can include a plurality of PI pattern portions 30 and associated PI pattern edge portions 31. As shown, in a preferred embodiment, when a plurality of such patterns are formed on the APR plate 10, dummy patterns 35 are inserted between each of the corresponding PI pattern and pattern edge portions 30, 31. Each of the PI pattern and associated pattern edge portion 30, 31 define a PI pattern set. Preferably, the dummy patterns 35 are spaced-apart from the PI pattern edge portions 31 and are configured to separate or be positioned between the next adjacent set of pattern portions. In a preferred embodiment, as shown in FIG. 8, the dummy patterns 35 include a plurality of projections formed similar to those described above and. Configuring the APR plate with dummy patterns 35 can help protect the PI pattern edge portions 31 from being broken due to impact damage associated with continuous printing applications. The dummy patterns 35 can thus facilitate the printing of a uniform PI layer using the APR plate of the instant invention even after the APR plate 10 has been continuously used in printing. In addition, this configuration can also inhibit PI lump generation at the pattern edge portion of the APR resin plate 10.

In summary, the present invention includes a hybrid APR plate formed with a material which is processed to have at least two different hardness values. As described herein the hybrid plate is preferably fabricated in such a manner that the PI pattern edge portion corresponding to the non-effective screen area of an LCD panel has an increased hardness so that PI lump generation can be inhibited, while and the PI pattern portion corresponding to the effective screen area of the LCD panel has a reduced hardness so that a uniform PI layer can be formed. Advantageously, even when the hybrid APR plate is repeatedly used, uniform PI layers can be continuously obtained and PI lump generation at the edge portions of the PI pattern portions can be inhibited.

This invention has been described above with reference to the aforementioned embodiments. It is evident, however, that many alternative modifications and variations will be apparent to those having skill in the art in light of the foregoing description. Accordingly, the present invention embraces all such alternatives, modifications and variations as fall within the spirit and scope of the appended claims.

What is claimed is:

1. A method for continuously forming an orientation layer on sequentially introduced liquid crystal display panels, comprising the steps of:

introducing a quantity of polyimide solution onto a rotating anilox roll;

compressing by contacting an exterior surface of the rotating anilox roll to a doctor roll positioned adjacent thereto to compress the anilox roll;

contacting the surface of the anilox roll to an APR resin plate attached to an underlying rotatable transfer cylinder to deliver a predetermined amount of the polyimide solution to the APR resin plate, wherein the APR resin plate includes at least one polyimide (PI) pattern portion corresponding to an effective screen area of the liquid crystal display having a material of a first hardness and at least one polyimide (PI) pattern edge portion corresponding to a non-effective screen area of the liquid crystal display having a material of a second hardness, and wherein the second hardness is greater than the first hardness;

positioning a liquid crystal display panel surface to underlay the APR resin plate; and printing a pattern of polyimide solution on the underlying liquid crystal display panel surface, said printing step comprising contacting pattern portions of the APR resin plate to the desired liquid crystal display panel surface.

2. A method according to claim 1, wherein said positioning step and said printing step are repeated.

3. A method according to claim 1, wherein said APR resin plate includes a plurality of corresponding PI pattern and PI pattern edge portions and a plurality of dummy patterns positioned between each of the corresponding PI pattern and PI pattern edge portions.

4. A method according to claim 1, wherein said method further comprises the step of directing air flow away from the APR resin plate.

5. A method according to claim 1, wherein the APR resin plate PI pattern edge portion is configured to abut and enclose the polyimide pattern portion.

6. A method according to claim 5, wherein the APR resin plate comprises a plurality of PI pattern edge portions, and wherein each of said PI pattern edge portions corresponds to one PI pattern portion to define a PI pattern set, and wherein each PI pattern set is spaced apart from the next adjacent PI pattern set.

7. A method according to claim 1, wherein the pattern edge portion is resistant to impact associated with contact with the underlying liquid crystal display panel surface during said printing step.

8. A method according to claim 1, wherein the PI pattern edge portion comprises a plurality of tapered projections.

9. A method according to claim 1, wherein the PI pattern portion is configured as a rectangular shaped surface pattern on the APR resin plate body and includes a series of projections and cells, and wherein the PI pattern edge portion encloses the perimeter of said rectangular shaped surface pattern.

10. A method according to claim 1, further comprising the step of advancing a plurality of liquid crystal display panels in sequence such that each is positioned at a predetermined height under said APR resin plate during said positioning and printing steps.

11. A method according to claim 10, further comprising the step of directing flowing air associated with said advancing step away from the APR resin plate.

12. A method according to claim 10, further comprising the step of heating the liquid crystal display panels after said printing step.

* * * * *